(12) United States Patent
Weng et al.

(10) Patent No.: US 11,287,725 B2
(45) Date of Patent: Mar. 29, 2022

(54) OPTICAL SYSTEM

(71) Applicant: TDK TAIWAN CORP., Taoyuan (TW)

(72) Inventors: Chih-Wei Weng, Taoyuan (TW);
Chao-Chang Hu, Taoyuan (TW);
Che-Wei Chang, Taoyuan (TW)

(73) Assignee: TDK TAIWAN CORP., Taoyuan (TW)

(*) Notice: Subject to any disclaimer, the term of this patent is extended or adjusted under 35 U.S.C. 154(b) by 10 days.

(21) Appl. No.: 16/860,743

(22) Filed: Apr. 28, 2020

(65) Prior Publication Data

US 2021/0029274 A1    Jan. 28, 2021

Related U.S. Application Data

(60) Provisional application No. 62/879,190, filed on Jul. 26, 2019.

(30) Foreign Application Priority Data

Dec. 20, 2019 (EP) ..................................... 19218896

(51) Int. Cl.
*G03B 13/36* (2021.01)
*G02B 7/09* (2021.01)
(Continued)

(52) U.S. Cl.
CPC .............. *G03B 13/36* (2013.01); *G01P 15/02* (2013.01); *G02B 7/04* (2013.01); *G02B 7/08* (2013.01); *G02B 7/09* (2013.01); *G02B 27/646* (2013.01); *G03B 5/00* (2013.01); *G03B 5/02* (2013.01); *H02K 33/18* (2013.01); *H02K 41/0354* (2013.01); *H02K 41/0356* (2013.01); *H04N 5/2251* (2013.01); *H04N 5/2252* (2013.01);
(Continued)

(58) Field of Classification Search
CPC .. G03B 13/36; G03B 5/02; G03B 2205/0076; G03B 2205/0007; G03B 2205/0069; G03B 30/00; G03B 3/10; G03B 3/02; G03B 3/00; G03B 5/00; G01P 15/02; H02K 41/0356; H02K 41/035; H02K 33/18; H02K 41/0354; G02B 7/09; G02B 7/282; G02B 7/08; G02B 7/04; G02B 27/646; H04N 5/2254; H04N 5/2257; H04N 5/2253; H04N 5/2251; H04N 5/2252; F03G 7/065
See application file for complete search history.

(56) References Cited

U.S. PATENT DOCUMENTS

2016/0259094 A1* 9/2016 Aschwanden ............ G02B 3/14
2019/0191090 A1* 6/2019 Murashima .......... G02B 27/646
(Continued)

*Primary Examiner* — Timothy J Henn
(74) *Attorney, Agent, or Firm* — Muncy, Geissler, Olds & Lowe, P.C.

(57) ABSTRACT

An optical system is provided. The optical system includes an optical member driving mechanism and an image sensor. The optical member driving mechanism includes a movable portion, a fixed portion and a first driving assembly. The movable portion is configured to connect an optical member, and the optical member has an optical axis. The movable portion is movable relative to the fixed portion. The first driving assembly drives the movable portion to move relative to the fixed portion. The image sensor is disposed to correspond to the optical member, and the optical axis passes through the image sensor.

19 Claims, 6 Drawing Sheets

(51) Int. Cl.
  *H04N 5/225* (2006.01)
  *G02B 7/04* (2021.01)
  *G02B 27/64* (2006.01)
  *G03B 5/00* (2021.01)
  *H02K 41/035* (2006.01)
  *G02B 7/08* (2021.01)
  *G01P 15/02* (2013.01)
  *G03B 5/02* (2021.01)
  *H02K 33/18* (2006.01)

(52) U.S. Cl.
  CPC ......... *H04N 5/2253* (2013.01); *H04N 5/2254* (2013.01); *H04N 5/2257* (2013.01); *G03B 2205/0007* (2013.01); *G03B 2205/0069* (2013.01); *G03B 2205/0076* (2013.01)

(56) References Cited

U.S. PATENT DOCUMENTS

| | | | |
|---|---|---|---|
| 2020/0259993 A1* | 8/2020 | Brodie | H04N 5/23287 |
| 2021/0028216 A1* | 1/2021 | Hubert | H01L 27/14629 |
| 2021/0132327 A1* | 5/2021 | Sharma | H04N 5/23212 |

* cited by examiner

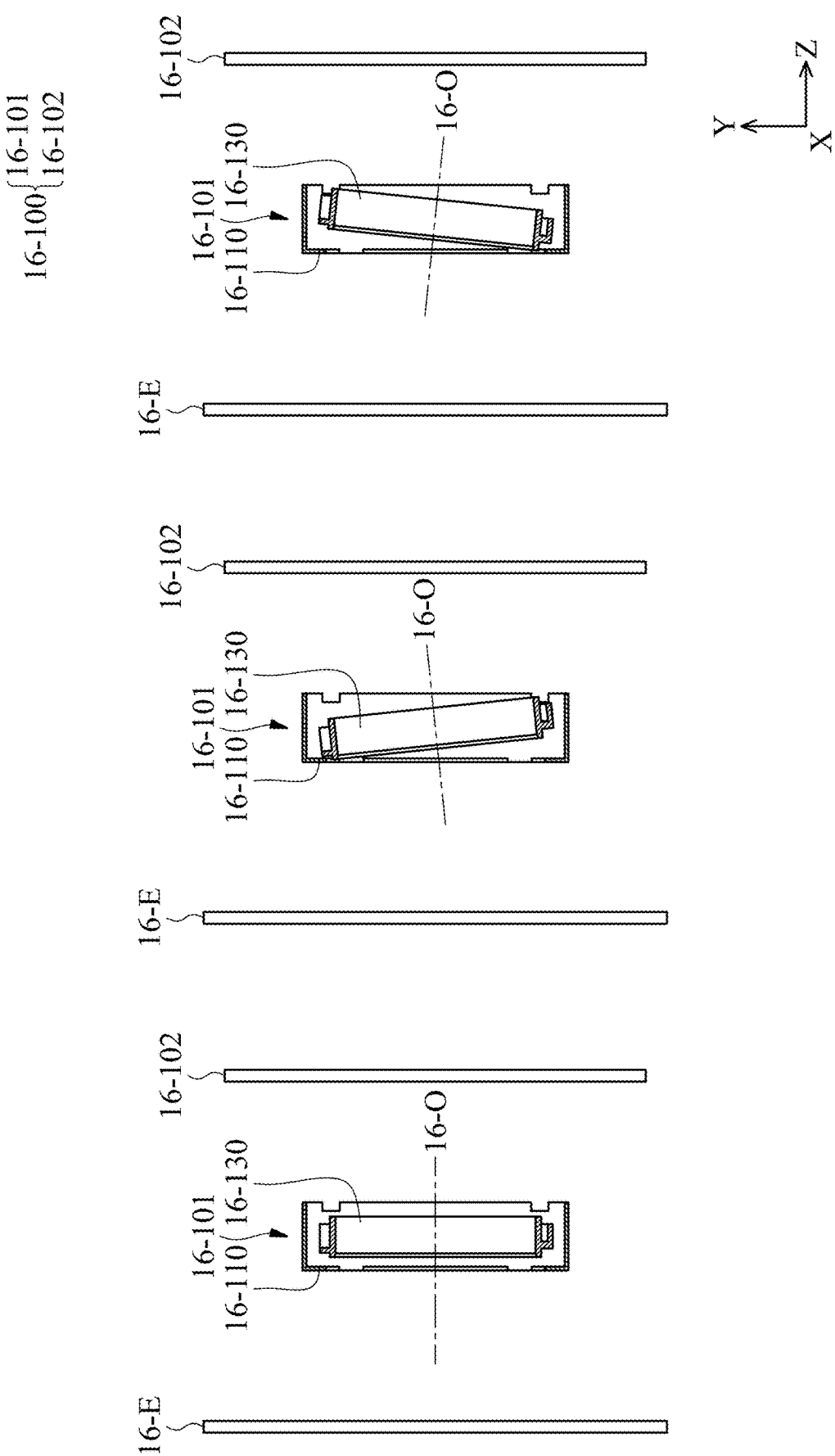

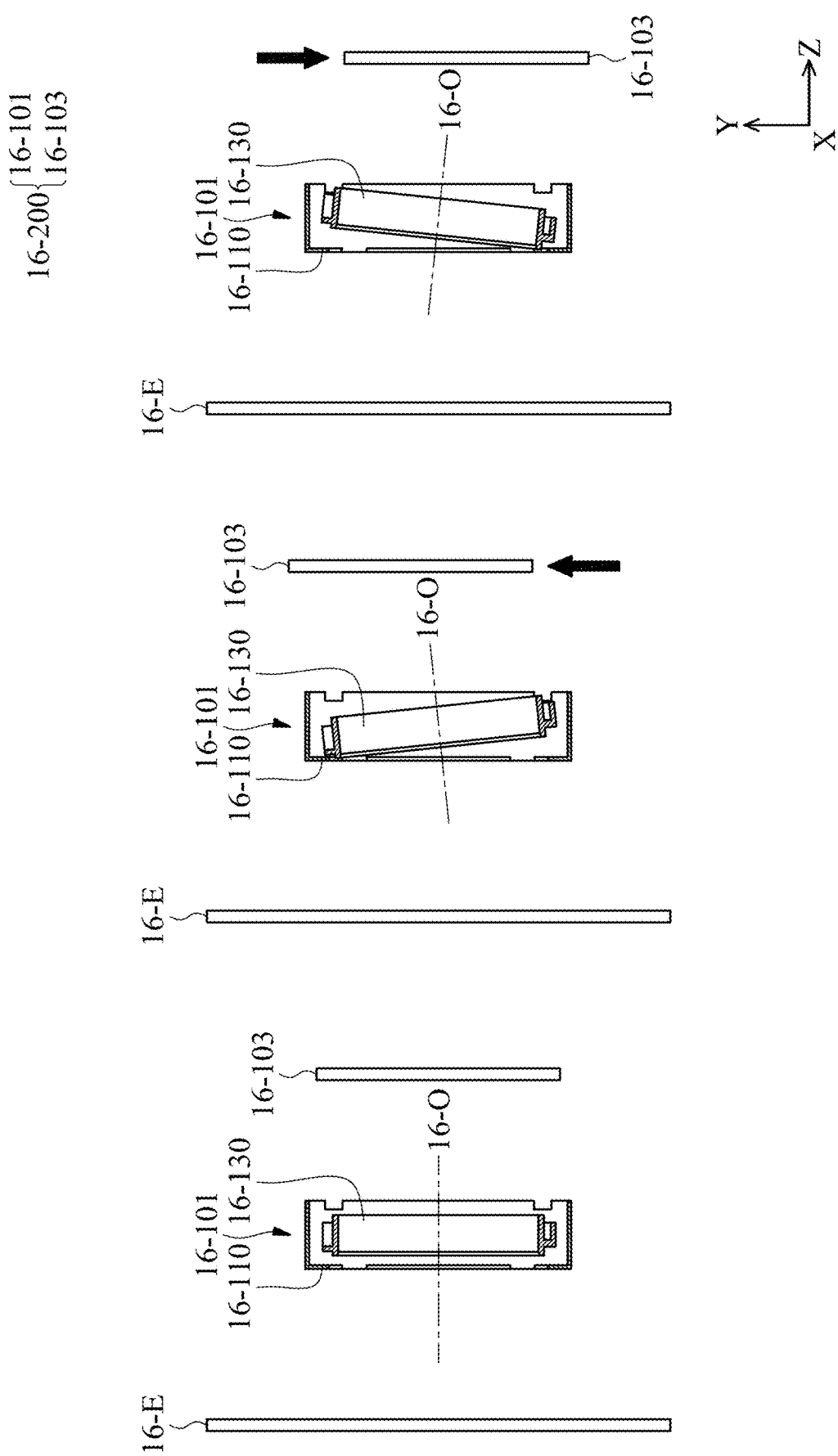

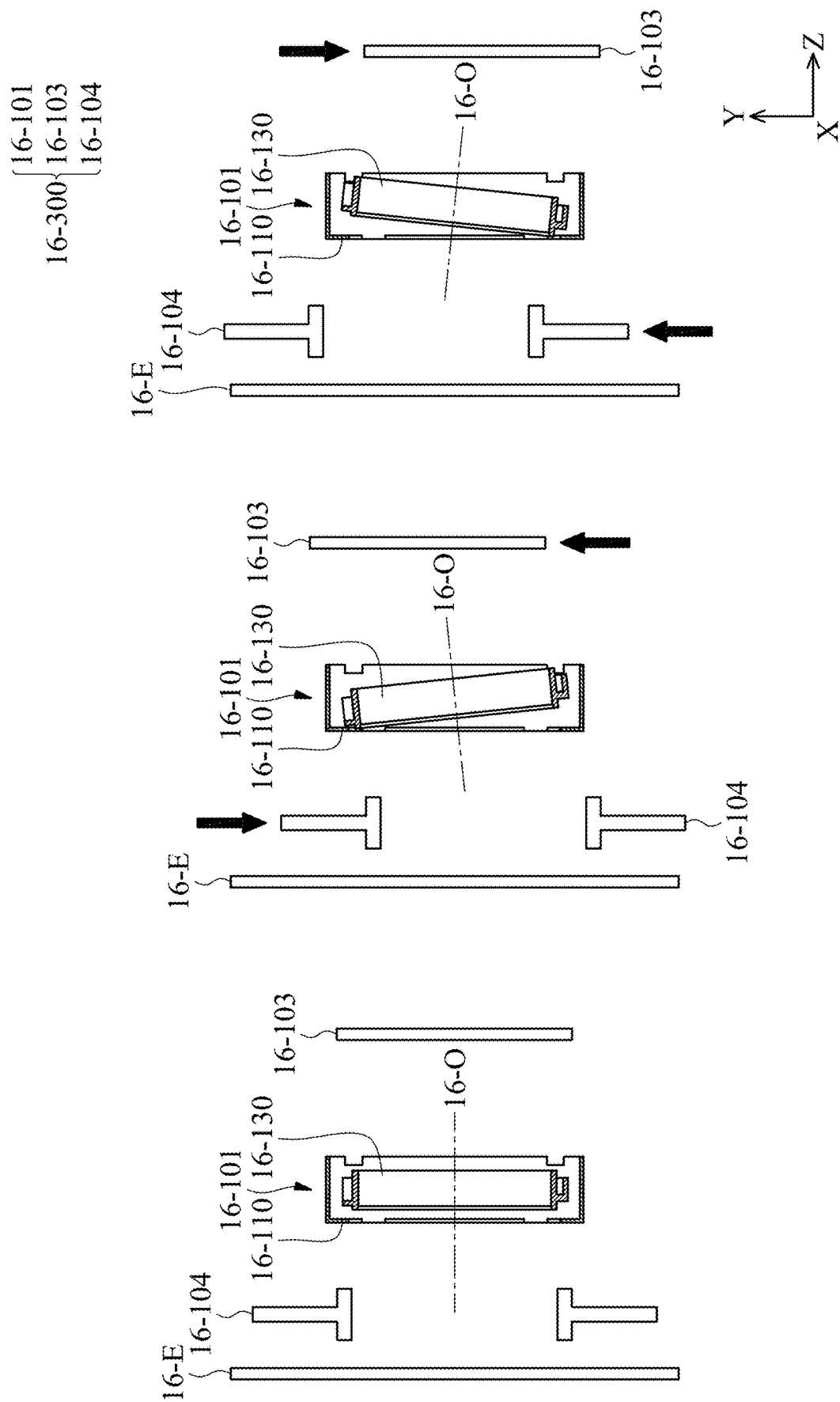

OPTICAL SYSTEM

CROSS REFERENCE TO RELATED APPLICATIONS

This application claims the benefit of U.S. Provisional Application No. 62/879,190, filed Jul. 26, 2019, and claims priority of European Patent Application No. 19218896.9, filed Dec. 20, 2019, the entirety of which are incorporated by reference herein.

BACKGROUND

Technical Field

The disclosure relates to an optical system, and in particular to an optical system including an image sensor that corresponds to an optical member driving mechanism.

Description of the Related Art

With the development of technology, many electronic devices (such as smartphones and digital cameras) nowadays perform the functions of a camera or video recorder. The use of such electronic devices has become increasingly widespread, and these electronic devices have been designed for convenience and miniaturization to provide users with more choices.

Electronic devices with a camera or video function usually have a lens driving module disposed therein to drive a lens to move along an optical axis. Therefore, an autofocus (AF) and/or optical image stabilization (OIS) function is achieved. Light may pass through the lens and form an image on a photosensitive member.

However, the optical characteristic of the lens driving module is usually not good enough to meet the requirement for users. Therefore, how to solve the aforementioned problem has become an important topic.

BRIEF SUMMARY

The present disclosure provides an optical system. The optical system includes an optical member driving mechanism and an image sensor. The optical member driving mechanism includes a movable portion, a fixed portion and a first driving assembly. The movable portion is configured to connect an optical member, and the optical member has an optical axis. The movable portion is movable relative to the fixed portion. The first driving assembly drives the movable portion to move relative to the fixed portion. The image sensor is disposed to correspond to the optical member, and the optical axis passes through the image sensor.

In an embodiment, the movable portion is rotatable relative to the fixed portion, and the optical axis is not parallel to a direction in which the optical member driving mechanism and the image sensor are arranged. In an embodiment, the size of the image sensor is different from the size of the optical member. In an embodiment, the size of the image sensor is greater than the size of the optical member.

In an embodiment, the optical system further includes a second driving assembly that is configured to drive the image sensor to move relative to the movable portion. In an embodiment, the size of the image sensor is not greater than the size of the optical member. In an embodiment, when viewed in the direction in which the optical member driving mechanism and the image sensor are arranged, the first driving assembly and the second driving assembly do not overlap. In an embodiment, when viewed in a direction that is perpendicular to the direction in which the optical member driving mechanism and the image sensor are arranged, the first driving assembly and the second driving assembly overlap.

In an embodiment, the image sensor has a lengthwise side and a widthwise side that is not parallel to the lengthwise side, and the image sensor is movable along a direction that is parallel to the widthwise side. In an embodiment, the optical system further includes a sensing assembly that is configured to detect the movement of the movable portion relative to the fixed portion, wherein the sensing assembly generates electric signals, and the second driving assembly drives the image sensor to move relative to the movable portion based on the electric signals. In an embodiment, the optical member driving mechanism further comprising a circuit board that is disposed on one side of the optical member driving mechanism, and the sensing assembly is disposed on the circuit board.

In an embodiment, the optical system further includes a photopermeable member that is connected to the optical member driving mechanism, wherein the optical member driving mechanism is located between the photopermeable member and the image sensor. In an embodiment, the photopermeable member is movable relative to the optical member driving mechanism, and the optical axis passes through the photopermeable member. In an embodiment, the moving direction of the photopermeable member is different from the moving direction of the image sensor. In an embodiment, the moving direction of the photopermeable member is opposite to the moving direction of the image sensor.

In an embodiment, the optical member driving mechanism further includes a circuit board and a circuit component. The circuit board is disposed on one side of the optical member driving mechanism, and the circuit component embedded in the fixed portion and electrically connected to the first driving assembly. In an embodiment, the circuit board and an exposed portion of the circuit component are located on opposite sides of the optical member driving mechanism.

In an embodiment, the first driving assembly further includes a first coil and a second coil, and when viewed in a direction that is parallel to the optical axis, the first coil and the second coil do not overlap. In an embodiment, the first driving assembly further includes a first magnetic member and a second magnetic member, and when viewed in a direction that is parallel to the optical axis, the first magnetic member and the second magnetic member do not overlap. In an embodiment, the first driving assembly further includes an elastic member, and the movable portion is movably connected to the fixed portion via the elastic member.

BRIEF DESCRIPTION OF THE DRAWINGS

The disclosure can be more fully understood by reading the subsequent detailed description and examples with references made to the accompanying drawings, wherein:

FIG. 4A-4C are schematic views illustrating an optical system in accordance with an embodiment of the present disclosure.

FIG. 5A-5C are schematic views illustrating the optical system in accordance with an embodiment of the present disclosure.

FIG. 6A-6C are schematic views illustrating the optical system in accordance with an embodiment of the present disclosure.

DETAILED DESCRIPTION OF THE INVENTION

The optical systems of some embodiments of the present disclosure are described in the following description. However, it should be appreciated that the following detailed description of some embodiments of the disclosure provides various concepts of the present disclosure which may be performed in specific backgrounds that can vary widely. The specific embodiments disclosed are provided merely to clearly describe the usage of the present disclosure by some specific methods without limiting the scope of the present disclosure.

In addition, relative terms such as "lower" or "bottom," "upper" or "top" may be used in the following embodiments in order to describe the relationship between one element and another element in the figures. It should be appreciated that if the device shown in the figures is flipped upside-down, the element located on the "lower" side may become the element located on the "upper" side.

It should be understood that although the terms "first," "second," etc. may be used herein to describe various elements, materials and/or portions, these elements, materials and/or portions are not limited by the above terms. These terms merely serve to distinguish different elements, materials and/or portions. Therefore, a first element, material and/or portion may be referred to as a second element, material and/or portion without departing from the teaching of some embodiments in the present disclosure.

Unless defined otherwise, all terms (including technical and scientific terms) used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined in the present disclosure. In addition, the terms "substantially," "approximately" or "about" may also be recited in the present disclosure, and these terms are intended to encompass situations or ranges that is substantially or exactly the same as the description herein. It should be noted that unless defined specifically, even if the above terms are not recited in the description, it should be read as the same meaning as those approximate terms are recited.

Figure 1:
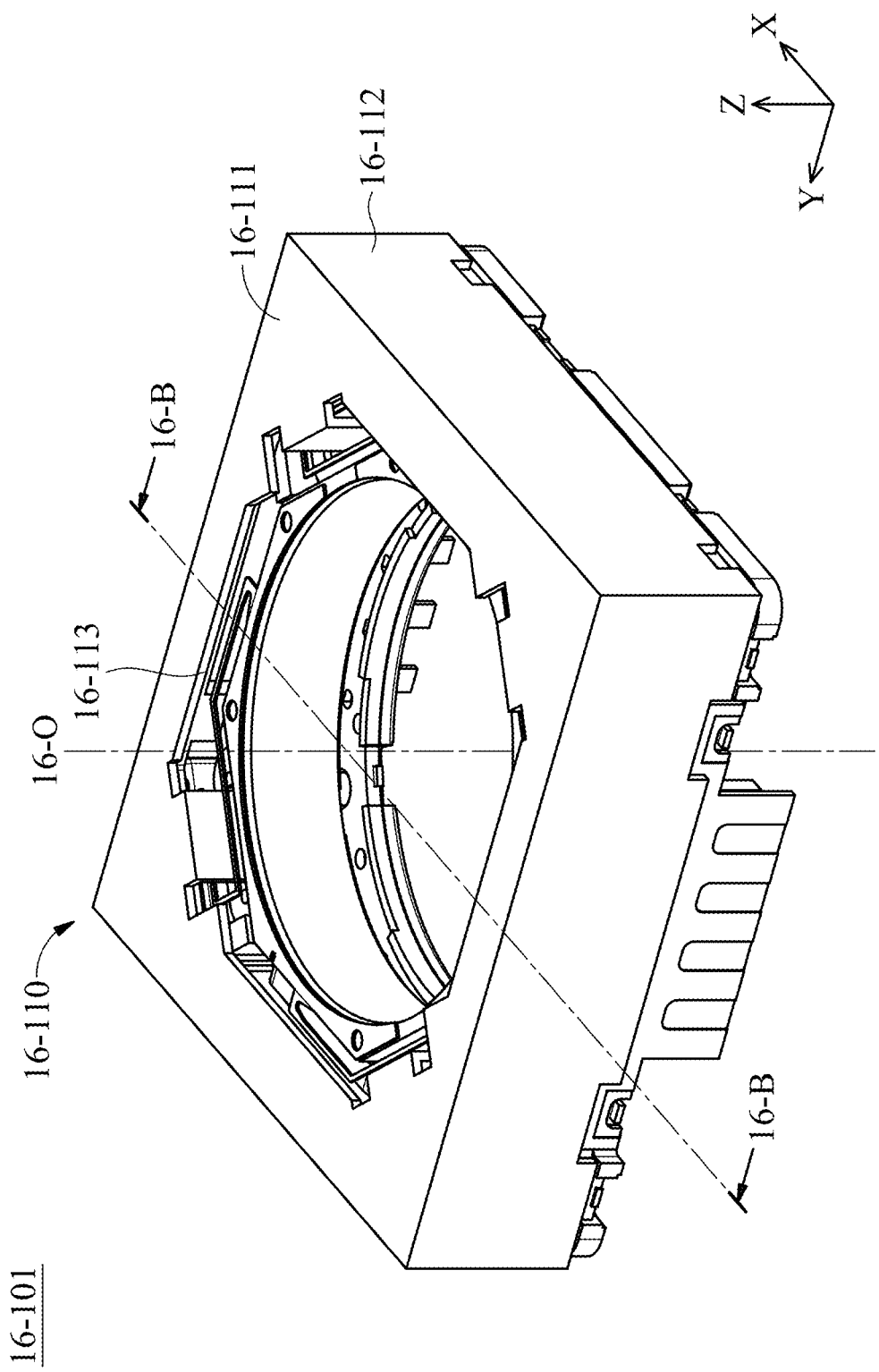
FIG. 1 is a perspective view illustrating an optical member driving mechanism in accordance with an embodiment of the present disclosure.

FIG. 1 is a schematic perspective view illustrating an optical member driving mechanism 16-101 in accordance with an embodiment of the present disclosure. It should be noted that, in this embodiment, the optical member driving mechanism 16-101 may be, for example, a voice coil motor (VCM), which may be disposed in the electronic devices with camera function for driving an optical member (such as a lens), and can perform an autofocus (AF) function. In addition, the optical member driving mechanism 16-101 has a substantial rectangular structure, wherein a housing 16-110 of the optical member driving mechanism 16-101 has includes a top surface 16-111 and four sidewalls 16-112. An opening 16-113 is formed on the top surface 16-111 and corresponds to the optical member (not shown). That is, an optical axis 16-O may pass through the opening 16-113, such that light may enter into the optical member driving mechanism 16-101 via the optical axis 16-O. In some embodiments, the sidewalls 16-112 extend from the edges of the top surface 16-111 along a direction that is perpendicular to the optical axis 16-O. In some embodiments, the sidewalls 16-112 extend from the edges of the top surface 16-111 along a direction that is not parallel to the optical axis 16-O.

Figure 2:
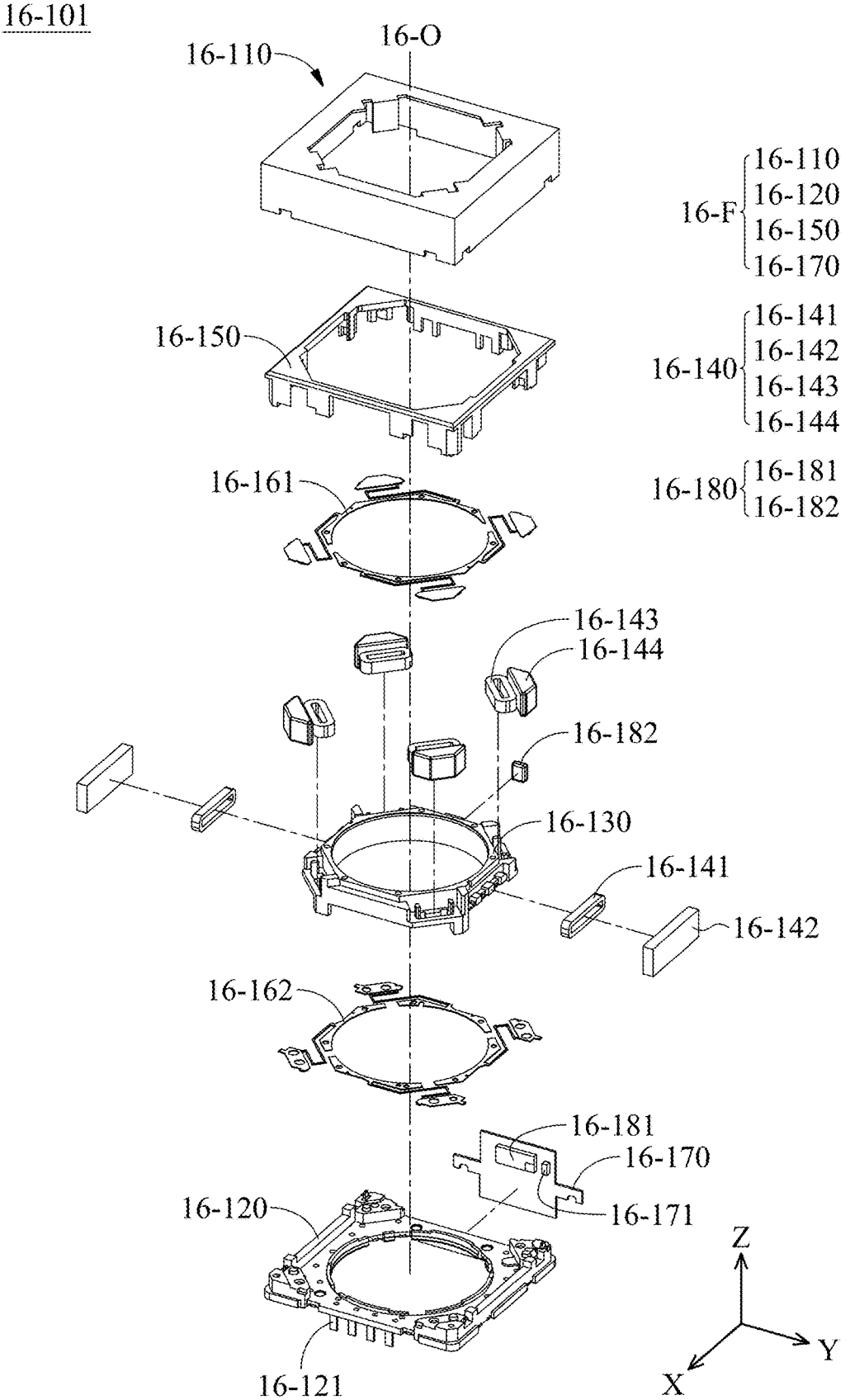
FIG. 2 is an exploded view illustrating the optical member driving mechanism shown in FIG. 1.

FIG. 2 is an exploded view illustrating the optical member driving mechanism 16-101 shown in FIG. 1. As shown in FIG. 2, the optical member driving mechanism 16-101 mainly includes a housing 16-110, a base 16-120, a movable portion 16-130, a driving assembly 16-140, a frame 16-150, a first elastic member 16-161, a second elastic member 16-162, a circuit board 16-170 and a sensing assembly 16-180. In addition, the housing 16-110, the base 16-120, the frame 16-150 and the circuit board 16-170 may constitute a fixed portion 16-F. The housing 16-110 and the base 16-120 may be assembled as a hollow case. Therefore, the movable portion 16-130, the first driving assembly 16-140, the frame 16-150, the first elastic member 16-161 and the second elastic member 16-162 may be surrounded by the housing 16-110, and thus may be contained in the case. Accordingly, the housing 16-110, the frame 16-150, and the base 16-120 are sequentially arranged along the optical axis 16-O. In other words, the light may sequentially pass through the housing 16-110, the frame 16-150 and the base 16-120, and reach an image sensor (as shown in FIG. 4) that is disposed out of the optical member driving mechanism 16-102 such that an image is generated.

The movable portion 16-130 has a hollow structure, and carries an optical member with an optical axis 16-O. The frame 16-150 is disposed on the base 16-120 and affixed to the housing 16-110. In addition, the movable portion 16-130 is movably connected to the housing 16-110 and the base 16-120. The first elastic member 16-161 is disposed between the housing 210 and the movable portion 16-130, and the second elastic member 16-162 is disposed between the movable portion and the base 16-120. To be more specific, the movable portion 16-130 may be connected to the housing 16-110 and the base 16-120 through the first elastic member 16-161 and the second elastic member 16-162, which are made of metallic materials. Therefore, the movable portion 16-130 is movably suspended between the housing 16-110 and the base 16-120, and the movable portion 16-130 may move along the optical axis 16-O between the housing 16-110 and the base 16-120. For example, the first elastic member 16-161 and the second elastic member 16-162 are made of metal or any other suitable material with a certain flexibility.

The first driving assembly 16-140 includes two first coils 16-141 and two first magnetic members 16-142. The first coils 16-141 may be disposed on the movable portion 16-130, and the first magnetic members 16-142 may be disposed on the frame 16-150. When a current is applied to the first coils 16-141, an electromagnetic driving force may be generated by the first coils 16-141 and the first magnetic members 16-142 to drive the movable portion 16-130 and the optical member carried therein to move along the Z-axis (i.e. the optical axis 16-O) relative to the base 16-120. Therefore, the autofocus (AF) function is performed. In other embodiment, the positions of the first coils 16-141 and the first magnetic members 16-142 are interchangeable. In other words, the first coils 16-141 may be disposed on the frame 16-150, and the first magnetic members 16-142 may be disposed on the movable portion 16-130. That way, the autofocus (AF) function may also be achieved.

In addition, the first driving assembly 16-140 further includes second coils 16-143 and second magnetic members 16-144. The second coils 16-143 may be disposed on the movable portion 16-130, and the second magnetic members 16-144 may be disposed on the frame 16-150. When a current is applied to the second coils 16-143, an electromagnetic driving force may be generated by the second coils 16-143 and the second magnetic members 16-144 to drive the movable portion 16-130 and the optical member carried therein to rotate relative to the base 16-120. Therefore, an optical calibration may be performed to the optical member driving mechanism 16-101, or optical member driving mechanism 16-101 may receive light from different positions.

In the present embodiment, the first coils 16-141 and the first magnetic members 16-142 are disposed on opposite sides of the optical member driving mechanism 16-101, and the second coils 16-143 and the second magnetic members 16-144 are disposed at corners of the optical member driving mechanism 16-101. As a result, when viewed in a direction (the Z axis) that is parallel to the optical axis 16-O, the first coils 16-141 and the second coils 16-143 do not overlap. In addition, when viewed in the direction that is parallel to the optical axis 16-O, the first magnetic members 16-142 and the second magnetic members 16-144 do not overlap.

The circuit board 16-170 is disposed on one side of the optical member driving mechanism 16-101 and configured to transmit electric signals. For example, the optical member driving mechanism 16-101 may control the position of the optical member based on the aforementioned electric signals, and therefore the autofocus (AF) function may be achieved. In the present embodiment, a circuit component 16-121 is disposed in the base 16-120 by insert molding technique, and is electrically connected to the first driving assembly 16-140. Therefore, the diversity of circuit design for the optical member driving mechanism 16-101 may be increased. In addition, an electric element 16-171 may be disposed on the circuit board 16-170. For example, the electric element 16-171 may be a resistor, a capacitor, an inductor or any other suitable electric element.

The sensing assembly 16-180 includes a position sensor 16-181 and a reference member 16-182, wherein the position sensor 16-181 is disposed on the circuit board 16-170, and the reference member 16-182 is disposed in the movable portion 16-130. The position sensor 16-181 may detect the change of the magnetic field generated by the reference member 16-182, such that the position of the movable portion 16-130 and the optical member may be determined. Accordingly, the driving assembly 16-140 may drive the movable portion 16-130 to move relative to the fixed portion 16-F based on the result detected by the position sensor 16-181. In some embodiments, the position sensor 16-181 or the reference member 16-182 is disposed on the fixed portion 16-F, and the other of the position sensor 16-181 or the reference member 16-182 is disposed on the movable portion 16-130.

Figure 3:
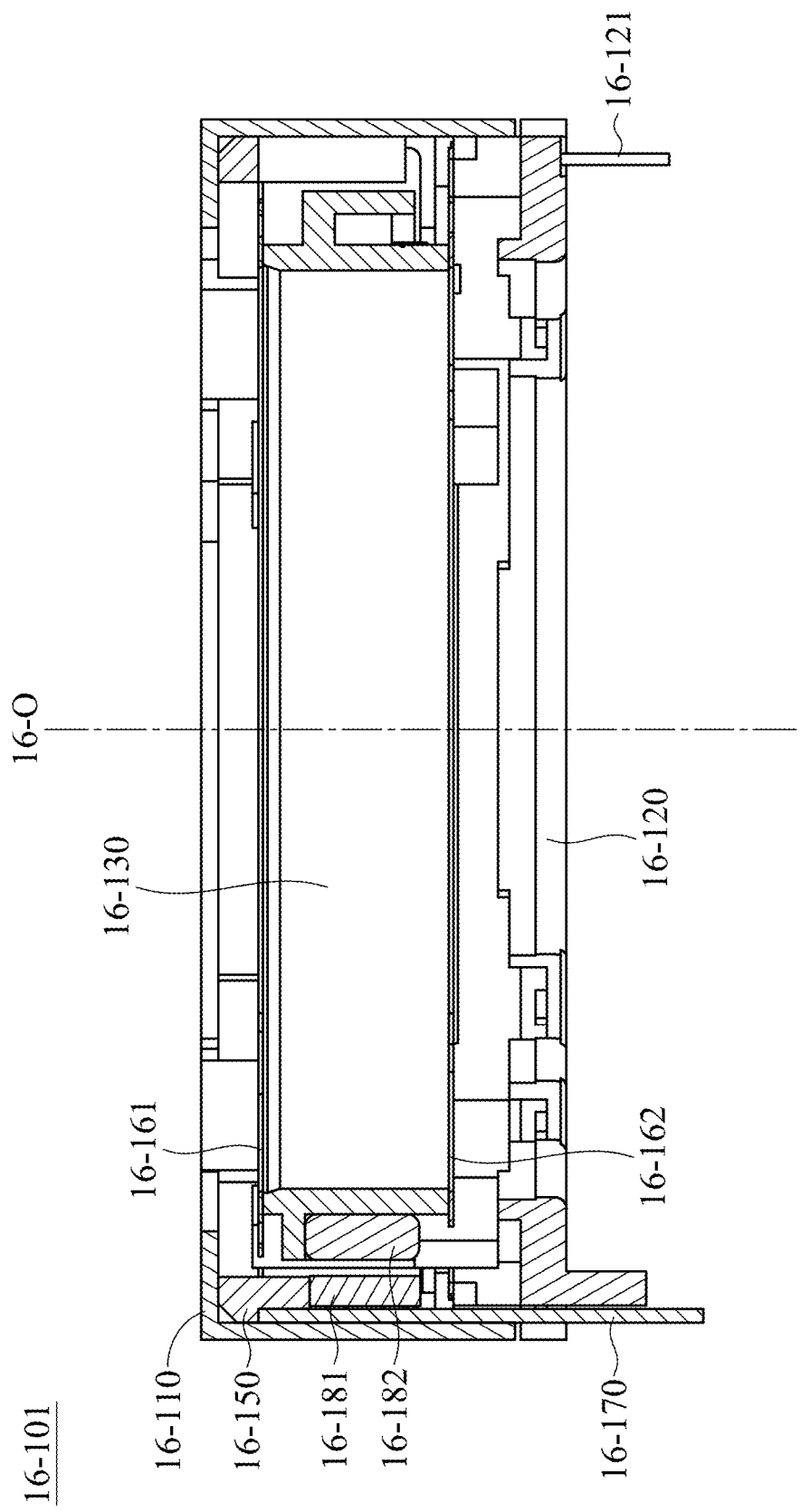
FIG. 3 is a cross-sectional view illustrating along line 16-B shown in FIG. 1.

FIG. 3 is a cross-sectional view illustrating along line 16-B shown in FIG. 1. As shown in FIG. 3, the circuit board 16-170 and an exposed portion of the circuit component 16-121 are located on different sides of the optical member driving mechanism 16-101. For example, the circuit board 16-170 and the exposed portion of the circuit component 16-121 are located on opposite sides of the optical member driving mechanism 16-101. The above design may avoid any interference between the circuit board 16-170 and the circuit component 16-121, maintaining normal operation for the optical member driving mechanism 16-101.

FIG. 4A-4C are schematic views illustrating an optical system 16-100 in accordance with an embodiment of the present disclosure. In the present embodiment, the optical system 16-100 includes the optical member driving mechanism 16-101 and a corresponding image sensor 16-102, wherein the optical axis 16-O may pass through the optical member driving mechanism 16-101 and the image sensor 16-102. As shown in FIG. 4A, light from a target 16-E may enter the optical member driving mechanism 16-101 along the optical axis 16-O and reach the image sensor 16-102. The image sensor 16-102 may receive the above light and form an image.

As shown in FIGS. 4B and 4C, the movable portion 16-130 is rotatable relative to the image sensor 16-102, making the optical axis 16-O not parallel to an arrangement direction of the optical member driving mechanism 16-101 and the image sensor 16-102. Since the optical axis 16-O may offset due to the rotation of the movable portion 16-130, the size of the image sensor 16-102 may be greater than the size of the optical member in the optical member driving mechanism 16-101. Even if the optical axis 16-O offsets, the image sensor 16-102 may still receive light from different directions. As a result, the image sensor 16-102 may receive light in a greater range than usual, and perform a treatment to the images generated by lights from different angles. Therefore, function of taking panoramic image and wide-angle photography may be achieved.

FIG. 5A-5C are schematic views illustrating an optical system 16-200 in accordance with an embodiment of the present disclosure. In the present embodiment, the optical system 16-200 includes the optical member driving mechanism 16-101 and a corresponding image sensor 16-103, wherein the optical axis 16-O may pass through the optical member driving mechanism 16-101 and the image sensor 16-103. As shown in FIG. 5A, light from a target 16-E may enter the optical member driving mechanism 16-101 along the optical axis 16-O and reach the image sensor 16-103. The image sensor 16-103 may receive the above light and form an image.

As shown in FIGS. 5B and 5C, the movable portion 16-130 is rotatable, making the optical axis 16-O offset. In addition, the image sensor 16-103 is movable in response to the rotation of the movable portion 16-130, such that the offset optical axis 16-O passes through the image sensor 16-103. As a result, the image sensor 16-103 may receive light in a greater range than usual, and perform a treatment to the images generated by lights from different angles so as to achieve function of taking panoramic image and wide-angle photography. Since the image sensor 16-103 is movable in response to the rotation of the movable portion 16-130, the size of the image sensor 16-103 may be not greater than the size of the optical member in the optical member driving mechanism 16-101.

In the present embodiment, the optical system 16-200 further includes a second driving assembly (not shown) that is configured to drive the image sensor 16-103 to move relative to the movable portion 16-130. For example, the second driving assembly may be disposed outside of the sidewall of the optical member driving mechanism 16-101. Accordingly, when viewed in the direction (the Z axis) in which the optical member driving mechanism 16-101 and the image sensor 16-103 are arranged, the first driving assembly 16-140 (as shown in FIG. 2) and the second driving assembly do not overlap. When viewed in a direction (e.g. the Y axis) that is perpendicular to the direction in which the optical member driving mechanism 16-101 and the image sensor 16-103 are arranged, the first driving assembly 16-140 and the second driving assembly overlap.

In addition, in some embodiments, the image sensor 16-103 may be rectangular and have a lengthwise side (e.g. parallel to the X axis) and a widthwise side (e.g. parallel to the Y axis) that is not parallel to the lengthwise side. The image sensor 16-103 moves along a direction that is parallel to the widthwise side (shown as the arrows in FIGS. 5B and 5C). In some embodiments, the image sensor 16-103 may be square, circle or any other suitable shapes.

FIG. 6A-6C are schematic views illustrating an optical system 16-300 in accordance with an embodiment of the present disclosure. In the present embodiment, the optical system 16-300 includes the optical member driving mechanism 16-101 and a image sensor 16-103, a photopermeable member 16-104 which correspond to the optical member driving mechanism 16-101. The optical axis 16-O may pass through the optical member driving mechanism 16-101, the image sensor 16-103 and the photopermeable member 16-104. In some embodiments, the photopermeable member 16-104 is connected to the optical member driving mechanism 16-101. For example, the photopermeable member 16-104 may be an aperture, a shutter or any other optical member that light may pass through.

As shown in FIG. 6A, light from a target 16-E may enter the optical member driving mechanism 16-101 along the optical axis 16-O via the photopermeable member 16-104 and reach the image sensor 16-103. The image sensor 16-103 may receive the above light and form an image.

As shown in FIGS. 6B and 6C, the movable portion 16-130 is rotatable, making the optical axis 16-O offset. In addition, the photopermeable member 16-104 is movable in response to the rotation of the movable portion 16-130, such that the offset optical axis 16-O passes through the photopermeable member 16-104. In the present embodiment, the moving direction of the photopermeable member 16-104 is opposite to the moving direction of the image sensor 16-103 (shown as the arrows in FIGS. 6B and 6C). That way, the optical axis 16-O passes through optical member driving mechanism 16-101, the image sensor 16-103 and the photopermeable member 16-104. As a result, function of taking panoramic image and wide-angle photography may be achieved by the optical system 16-300.

As set forth above, the embodiments of the present disclosure provide an optical system including an image sensor that corresponds to an optical member driving mechanism. The embodiments of the present disclosure provide multiple arrangements for the image sensor to cooperate with the movement of the optical member driving mechanism, forming an image by receiving the light. In addition, the design of a larger image sensor or a movable image sensor may increase the range for receiving the light, and function of taking panoramic image and wide-angle photography may be achieved by performing a treatment to the images.

While the embodiments and the advantages of the present disclosure have been described above, it should be understood that those skilled in the art may make various changes, substitutions, and alterations to the present disclosure without departing from the spirit and scope of the present disclosure. In addition, the scope of the present disclosure is not limited to the processes, machines, manufacture, composition, devices, methods and steps in the specific embodiments described in the specification. Those skilled in the art may understand existing or developing processes, machines, manufacture, compositions, devices, methods and steps from some embodiments of the present disclosure. As long as those may perform substantially the same function in the aforementioned embodiments and obtain substantially the same result, they may be used in accordance with some embodiments of the present disclosure. Therefore, the scope of the present disclosure includes the aforementioned processes, machines, manufacture, composition, devices, methods, and steps. Furthermore, each of the appended claims constructs an individual embodiment, and the scope of the present disclosure also includes every combination of the appended claims and embodiments.

What is claimed is:

1. An optical system, comprising:
   an optical member driving mechanism, comprising:
      a movable portion connected to an optical member, wherein the optical member has an optical axis;
      a fixed portion, wherein the movable portion is movable relative to the fixed portion; and
      a first driving assembly configured to drive the movable portion to move relative to the fixed portion, wherein the first driving assembly is disposed between the movable portion and the fixed portion;
   an image sensor disposed to correspond to the optical member, wherein the optical axis passes through the image sensor; and
   a second driving assembly configured to drive the image sensor to move relative to the movable portion, wherein the second driving assembly is disposed outside of the sidewall of the optical member driving mechanism, the movable range of the image sensor extends over the projection of the optical member driving mechanism on a plane that is parallel to a top surface of the optical member driving mechanism.

2. The optical system as claimed in claim 1, wherein the movable portion is rotatable relative to the fixed portion, and the optical axis is not parallel to a direction in which the optical member driving mechanism and the image sensor are arranged.

3. The optical system as claimed in claim 2, wherein the size of the image sensor is different from the size of the optical member.

4. The optical system as claimed in claim 3, wherein the size of the image sensor is greater than the size of the optical member.

5. The optical system as claimed in claim 1, wherein the size of the image sensor is not greater than the size of the optical member.

6. The optical system as claimed in claim 1, wherein when viewed in the direction in which the optical member driving mechanism and the image sensor are arranged, the first driving assembly and the second driving assembly do not overlap.

7. The optical system as claimed in claim 1, wherein when viewed in a direction that is perpendicular to the direction in which the optical member driving mechanism and the image sensor are arranged, the first driving assembly and the second driving assembly overlap.

8. The optical system as claimed in claim 1, wherein the image sensor has a lengthwise side and a widthwise side that is not parallel to the lengthwise side, and the image sensor is movable along a direction that is parallel to the widthwise side.

9. The optical system as claimed in claim 1, further comprising a sensing assembly configured to detect the movement of the movable portion relative to the fixed portion, wherein the sensing assembly generates electric signals, and the second driving assembly drives the image sensor to move relative to the movable portion based on the electric signals, wherein the sensing assembly is disposed on the fixed portion and in the movable portion.

10. The optical system as claimed in claim 9, wherein the optical member driving mechanism further comprises a circuit board disposed on one side of the optical member driving mechanism, and the sensing assembly is disposed on the circuit board.

11. The optical system as claimed in claim 1, further comprising a photopermeable member connected to the optical member driving mechanism, wherein the optical member driving mechanism is located between the photopermeable member and the image sensor.

12. The optical system as claimed in claim 11, wherein the photopermeable member is movable relative to the optical member driving mechanism, and the optical axis passes through the photopermeable member.

13. The optical system as claimed in claim 12, wherein the moving direction of the photopermeable member is different from the moving direction of the image sensor.

14. The optical system as claimed in claim 13, wherein the moving direction of the photopermeable member is opposite to the moving direction of the image sensor.

15. The optical system as claimed in claim 1, wherein the optical member driving mechanism further comprises:
 a circuit board disposed on one side of the optical member driving mechanism; and
 a circuit component embedded in the fixed portion and electrically connected to the first driving assembly.

16. The optical system as claimed in claim 15, wherein the circuit board and an exposed portion of the circuit component are located on opposite sides of the optical member driving mechanism.

17. The optical system as claimed in claim 1, wherein the first driving assembly further comprises a first coil and a second coil, and when viewed in a direction that is parallel to the optical axis, the first coil and the second coil do not overlap.

18. The optical system as claimed in claim 1, wherein the first driving assembly further comprises a first magnetic member and a second magnetic member, and when viewed in a direction that is parallel to the optical axis, the first magnetic member and the second magnetic member do not overlap.

19. The optical system as claimed in claim 1, wherein the first driving assembly further comprises an elastic member, and the movable portion is movably connected to the fixed portion via the elastic member.

* * * * *